Oct. 24, 1939.   J. E. HODGKINSON   2,177,215
LICENSE PLATE FASTENER
Filed Jan. 4, 1939
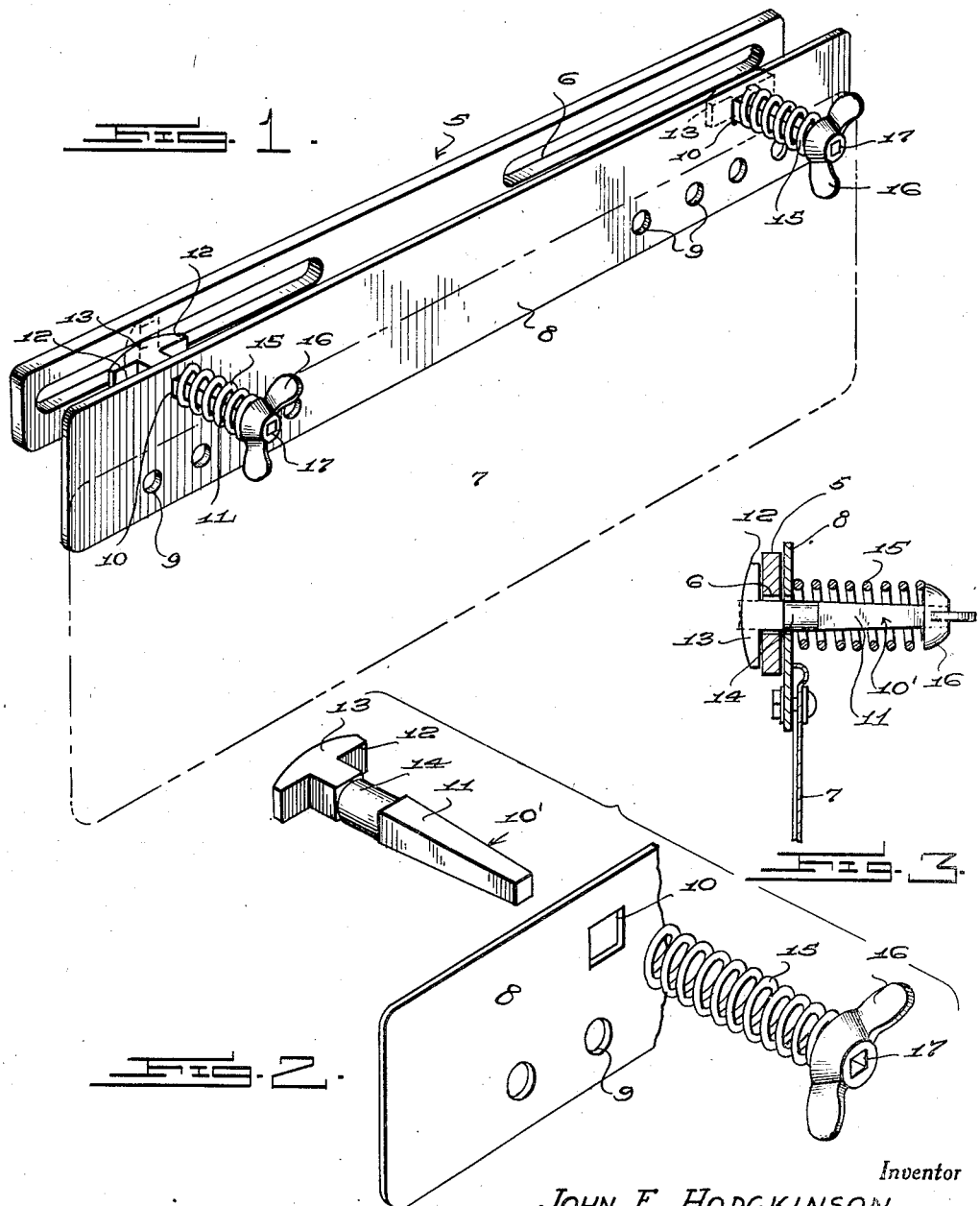
Inventor
JOHN E. HODGKINSON,
By Clarence A. O'Brien
and Hyman Berman
Attorneys Patented Oct. 24, 1939

2,177,215

UNITED STATES PATENT OFFICE 2,177,215

LICENSE PLATE FASTENER

John Edwin Hodgkinson, Riverhead, N. Y.

Application January 4, 1939, Serial No. 249,331

2 Claims. (Cl. 40—125)

This invention relates to an automobile license plate fastener, and has for the primary object the provision of a device of this character which will permit a person to easily and quickly install a license plate on a conventional license plate bracket of an automobile without the use of tools, bolts and similar fasteners now commonly employed and will also allow the license plate to be removed with as much ease as when applying, so that the device will be found especially useful by dealers and like persons engaged in the automobile business wherein it is frequently necessary to transfer license plates from one automobile to another.

With these and other objects in view, the invention consists in certain novel features of construction, combination and arrangement of parts to be hereinafter more fully described and claimed.

For a complete understanding of my invention, reference is to be had to the following description and accompanying drawing, in which Figure 1 is a perspective view illustrating an automobile license plate fastener constructed in accordance with the present invention and showing the same positioned for application to a conventional license plate bracket of an automobile.

Figure 2 is a fragmentary exploded perspective view showing one of the fastening elements disassembled from an attaching plate.

Figure 3 is a fragmentary transverse sectional view showing the license plate secured on the bracket through the use of the present invention.

Referring in detail to the drawing, the numeral 5 indicates a conventional type of license plate bracket found on automobiles now in use and which is provided with elongated slots 6 for the purpose of receiving bolts or like fasteners for securing a license plate directly onto the bracket. With the use of the present invention the securing of a license plate directly on the bracket 5 through the use of bolts is eliminated and which will permit the license plate to be readily attached onto the bracket 5 without the use of tools and with ease on the part of the operator and which will permit the license plate to be readily removed from the bracket whenever desired.

In the drawing the license plate is indicated by the character 7 and is secured onto an elongated attaching strip or plate 8 through the use of bolts or like fasteners, the plate 8 having a series of openings 9 through which the bolts or like fasteners may pass in order that the license plate may be secured onto the attaching plate in a depending position. The attaching plate when applied to the license plate projects a limited distance above the upper edge of the license plate and is provided with rectangular shaped openings 10 to slidably receive fastening devices 10' each consisting of a substantially T-shaped member including a stem 11 and an elongated head 12 having oppositely arranged flattened faces 13 and gradually tapering toward each end. The stem 11 tapers toward its free end and has angularly related faces to match the walls of the openings 10. The external diameter of the stem 11 is such as to permit the stem to slide freely through the openings 10. A portion of the stem adjacent the head is provided with an annular groove 14. After the stem 11 has been passed through the opening 10 of the attaching plate 8 a coil spring 15 is mounted thereon and bears against the attaching plate and against a wing nut 16 having an opening 17 shaped to match the faces of the stem 11 with a tight frictional fit. Also the stem after having the nut 16 applied thereto is riveted or upset to prevent accidental removal of the nut. The spring 15 acts to draw the head 12 toward the attaching plate. The diameter of the portion of the stem between the annular groove 14 and the head 12 is such that it may move freely through the slot 6 of the bracket 5 when the head 12 is positioned longways of the slot. However, the stem 11 cannot be rotated until the annular groove 14 lies within the slot 6 and opening 10 then the stem may be rotated to position the head at right-angles to the slot and in engagement with an opposite face of the bracket from the face engaged by the attaching plate 8.

In operation, when it is desired to attach the license plate 7 which has been equipped with the present invention onto the bracket 5, the heads 12 of the fasteners 10 are positioned so as to pass freely through the slots 6. The passing of the stems 11 of the fasteners through the slots is continued until the annular grooves 14 are within the slots 6 and the openings 10. The wing nuts are then rotated to bring about rotation of the stems to position the heads at right angles to the slots 6 and on releasing the wing nuts the spring acts to draw the heads tightly against the bracket and the attaching plate 8 tightly against the bracket thereby efficiently securing the license plate on the bracket 5 for easy and quick removal when desired. To remove the license plate it is only necessary to push in on the wing nuts and give them one-quarter turn to align the heads with the slots and on release of the wing nuts the springs act to draw the heads through the slots and thereby free the license plate from the bracket.

The fastening devices being mounted on the license plate by the attaching strip or plate 8 prevents the loss or separation of the fastening devices from the license plate when the latter is removed from an automobile, and also aids a person in applying the fastening devices to the bracket 5 as heretofore described.

It is believed that the foregoing description, when taken in connection with the drawing, will fully set forth the construction and advantages of this invention to those skilled in the art to which this device relates, so that further detailed description will not be required.

What I claim is:

1. A device of the character described comprising an attaching plate adapted to have a license plate secured thereto, fastening devices slidably mounted in the attaching plate and each including a T-shaped element having a stem capable when in one position of being passed freely through a slot of a supporting bracket and adapted to be rotated to bring the head portion thereof in a position at right angles to the slot, means to permit the stems to rotate relative to the plate, coil springs mounted on the stems of the fastening devices and bearing against the attaching plate, wing nuts secured on the stems of the fastening devices and providing finger grips and seats for the coil springs, each of said stems including angularly related faces and each stem tapering toward its nut supporting end.

2. A device of the character described comprising an attaching plate adapted to have a license plate secured thereto, fastening devices slidably mounted in the attaching plate and each including a T-shaped element having a stem capable when in one position of being passed freely through a slot of a supporting bracket and adapted to be rotated to bring the head portion thereof in a position at right angles to the slot, coil springs mounted on the stems of the fastening devices and bearing against the attaching plate, wing nuts secured on the stems of the fastening devices and providing finger grips and seats for the coil springs, each of said stems including angularly related faces and each stem tapering toward its nut supporting end, each of said stems having an annular groove to permit the stem to be rotated in the slot of the bracket and relative to the plate.

J. EDWIN HODGKINSON.